United States Patent Office 3,523,151
Patented Aug. 4, 1970

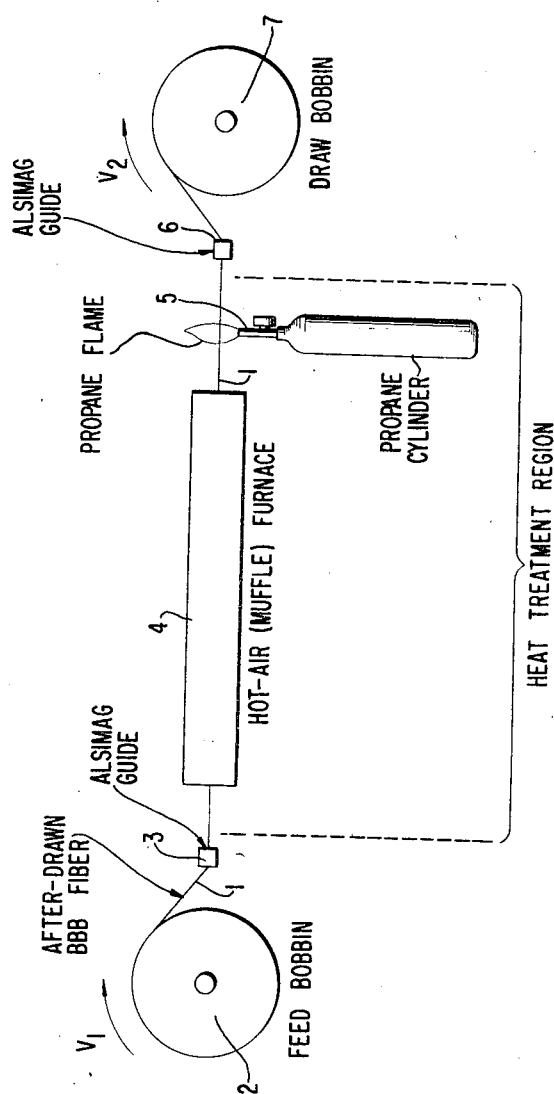

3,523,151
ULTRA-STABLE POLYMERS OF BBB TYPE, ARTICLES SUCH AS FIBERS MADE THEREFROM, AND HIGH TEMPERATURE PROCESS FOR FORMING SUCH POLYMERS AND ARTICLES
Jay M. Steinberg, Plainfield, N.J., assignor to Celanese Corporation, New York, N.Y., a corporation of Delaware
Filed Nov. 7, 1967, Ser. No. 681,136
Int. Cl. B29c 25/00
U.S. Cl. 264—210
7 Claims

ABSTRACT OF THE DISCLOSURE

Plastic articles of particularly high thermal stability, such as fibers or other extruded shapes, are made from "BBB" type polymers, i.e., polymers of the polyaroylenebenzimidazole type, or more particularly of the polybisbenzimidazobenzophenanthroline type, by heat treatment of sufficiently oriented polymer at an ultra-high temperature between about 750° and 1500° C. following preheating at an intermediate temperature in the 500° to 700° C. range. As a result of such a high-temperature treatment a new kind of polymer structure is obtained which is attributed to the splitting out of the carbonyl groups from the BBB polymer molecule.

BACKGROUND OF THE INVENTION

In recent years the use of various shaped, rigid components, woven fabrics and other articles made from plastic materials capable of resisting high temperatures has attracted considerable attention in connection with space vehicle structures or in auxiliary equipment such as re-entry parachutes for such vehicles. Condensation polymers of the benzimidazobenzophenanthroline type, made as described for instance in an earlier copending patent application Celanese Docket No. 4449, U.S. Ser. No. 657,868, filed Aug. 2, 1967, have been among the more attractive materials heretofore proposed in this connection. However, while oriented fibers wet spun from this type of polymer have shown superior tensile properties and strength retention ability at temperatures up to about 800° C., and even these have tended to degrade at more elevated temperatures.

Th objects of the present invention include the production of still more thermally stable polymer compositions, and particularly the production of fibers, films and the like therefrom.

SUMMARY OF INVENTION

It has now been discovered that polymers possessing a new kind of molecular structure and particularly good thermal stability even at temperatures above 800° C. can be prepared by subjecting the previously known kind of BBB type oriented polymers to a special kind of heat treatment. More particularly, it has been discovered that a new and upgraded product can be obtained by preheating BBB type oriented polymers to a temperature between about 500° and 700° C., e.g., 0.2 second at 600° C. and in such preheated condition further treating them for a small fraction of a second at between about 750° and 1500° C., preferably between about 1000° and 1300° C., e.g., by passing them through a propane flame having a flame temperature of about 1200° C. at a rate resulting in an appropriately limited flame residence time of between about 1 and 30 or 50 milliseconds. For reasons which those skilled in the synthetic fiber art will readily understand, the optimum flame residence time depends somewhat on factors such as the specific temperature and heating environment employed, the thickness and initial strength of the fiber, film or other plastic body being treated, etc. As a result of such heat treatment the molecular structure of the polymer changes from the usual structure represented by Formula I (I)

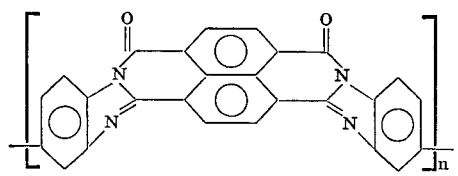

to a decarbonylated structure presumably represented by Formula II (II)

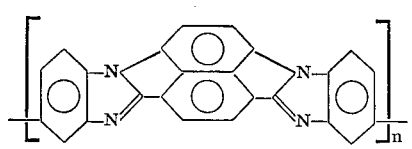

BRIEF DESCRIPTION OF DRAWING

The attached drawing is a schematic illustration of an apparatus suitable for preheating a previously hot drawn or oriented BBB type fiber and further heat treating such preheated fiber.

DETAILED DESCRIPTION

The starting polymer

The present invention is generally applicable to poly (aroylenebenzimidazoles) or, more particularly, to poly (bisbenzimidazobenzophenanthroline), herein referred to as BBB polymers. As is now otherwise known in the art, these polymers are made by mixing and condensing (1) at least one organic tetra-amine having the structural formula

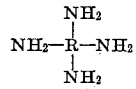

wherein R is a monocyclic or bicyclic aromatic or cycloaliphatic tetravalent hydrocarbon radical and wherein each of the four amino groups is attached directly to a carbon atom of a ring of said aromatic or cycloaliphatic radical in a position which is ortho or peri (in the case of a bicyclic radical) to another carbon atom to which a second amino group is also directly attached; with (2) at least one tetracarboxylic acid (which also may be in the form of the corresponding dianhydride) having the structural formula

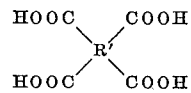

wherein R' is a tetravalent radical containing at least 2 carbon atoms and wherein no more than 2 carboxy or carbonyl groups of said acid or anhydride are attached to any one carbon atom of said tetravalent radical.

The reaction involved in the formation of these polymers may be effected in an organic liquid which is a solvent for at least one of the reactants, and is inert to the reactants, preferably under anhydrous conditions, at a temperature below 125° C., preferably at below 100° C., and for a time sufficient to provide the desired condensation product without gelation. Subsequent high temperature heating is required to completely cyclize the polymer. The tetra-amine and tetracarboxy acid or corresponding dianhydride are preferably reacted in substantially equimolar quantities. Alternatively, the polymerization may be effected in an inorganic solvent such as polyphosphoric acid by heating at temperatures of 100° to 250° C. for a sufficient time to produce the desired molecular weight.

If an excessive reaction temperature is used, a product which is difficult or impossible to shape is obtained. But the permissible upper temperature limit will vary depending upon the monomer and solvent system used, the mutual proportions of the monomers, and the concentration in the polymerization mixture and the minimum time that one desires for the reaction. The particular polymerization temperatures that should not be exceeded if a particular system is desired to provide a reaction product composed of a shapable polymer will accordingly vary from system to system but can be determined for any given system by a simple test by any person ordinary skill in the art.

It is preferred that the molecular weight of the polymer used herein be such that its inherent viscosity be at least 0.3, preferably 0.5 to 5.0. The inherent viscosity is measured at 25 C. at a concentration of 0.4 g. of polymer per 100 ml. of solvent. Ninety-seven percent sulphuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$\text{I.V.} = \frac{\ln \frac{V_2}{V_1}}{C}$$

In the above formula, $V_2$ is the viscosity of the solution. $V_1$ is the viscosity of the solvent, and C is the concentration expressed in grams of polymer per 100 ml. of solution. As is known in the polymer art, inherent viscosity is monotonically related to the molecular weight of the polymer.

Non-limiting examples of the tetra-amine monomers which may be used individually or in mutual admixture in forming the desired polymers are: 3,3'-diaminobenzidine; bis(3,4 - diamino phenyl) methane; 1,2-bis(3,4-diamino phenyl) ethane; 2,2 - bis(3,4-diamino phenyl) propane; bis(3,4 - diamino phenyl) ether; bis(3,4 - diaminophenyl) sulfide; bis(3,4 - diamino phenyl) sulfone; 1,2,4,5-tetra-amino benzene; 2,3,6,7-tetraamino naphthalene; etc., and the corresponding ring-hydrogenated tetra-amines.

Non-limiting examples of the tetracarboxylic acids include:

pyromellitic acid;
2,3,6,7-naphthalene tetracarboxylic acid;
3,3',4,4'-diphenyl tetracarboxylic acid;
1,4,5,8-naphthalene tetracarboxylic acid;
2,2',3,3'-diphenyl tetracarboxylic acid;
2,2-bis(3,4-dicarboxyphenyl) propane acid;
bis(3,4-dicarboxyphenyl) sulfone acid;
3,4,9,10-perylene tetracarboxylic acid;
bis(3,4-dicarboxyphenyl) ether acid;
ethylene tetracarboxylic acid;
naphthalene-1,2,4,5-tetracarboxylic acid;
decahydronaphthalene-1,4,5,8-tetracarboxylic acid;
4,8-dimethyl-1,2,3,5,6-hexahydronaphthalene-1,2,5,6-tetracarboxylic acid;
2,6-dichloronaphthalene-1,4,5,8-tetracarboxylic acid;
2,7-dichloronaphthalene-1,4,5,8-tetracarboxylic acid;
2,3,6,7-tetrachloronaphthalene-1,4,5,8-tetracarboxylic acid;
phenanthrene-1,8,9,10-tetracarboxylic acid;
cyclopentane-1,2,3,4-tetracarboxylic acid;
pyrrolidine-2,3,4,5-tetracarboxylic acid;
pyrazine-2,3,5,6-tetracarboxylic acid;
2,2-bis(2,3-dicarboxyphenyl) propane acid;
1,1-bis(2,3-dicarboxyphenyl) ethane acid;
1,1-bis(3,4-dicarboxyphenyl) ethane acid;
bis(2,3-dicarboxyphenyl) methane acid;
bis(3,4-dicarboxyphenyl) methane acid;
bis(3,4-dicarboxyphenyl) sulfone acid;
benzene-1,2,3,4-tetracarboxylic acid;
1,2,3,4-butane tetracarboxylic acid;
thiophene-2,3,4,5-tetracarboxylic acid;
and similar acids, as well as the dianhydrides of such acids.

In a preferred embodiment, the present invention is directed to fibers formed from poly(bisbenzimidazobenzophenanthroline), i.e., BBB polymers. Such polymers are formed from 1,4,5,8 - naphthalene tetracarboxylic acid and 3,3'-diamino benzidine according to Equation A:

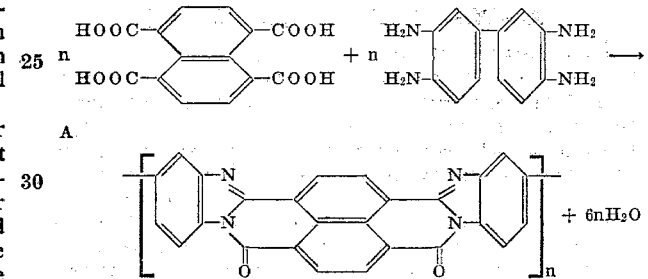

A

A preferable method of preparing BBB polymers includes effecting the polymerization in polyphosphoric acid (PPA) where the reaction according to Equation A occurs producing fully cyclized polymer. Use of polyphosphoric acid as the solvent permits reactions to be carried out over a wide range of temperatures, e.g., 80° to 300° C. The polyphosphoric acid preferably employed has a $P_2O_5$ equivalent of about 82% to 84% which is a solution of approximately 5% to 20% ortho- and pyrophosphoric acids mixed with various polyphosphoric acid, mostly trimers, tetramers, pentamers and hexamers.

Both the reaction temperature and the reaction period used significantly affects the degree of polymerization. Generally, reaction periods can range from about 0.5 to 100 hours at the above-mentioned reaction temperatures. Higher reaction temperatures tend to result in polymer products having higher inherent viscosity than polymers produced at lower temperatures and at comparable reaction periods. If the polymerization reaction is carried only to an intermediate stage, a solution containing the intermediate amine substituted polyamide acids in the form of a tractable polymer can be cast into a film or dry spun through a spinneret or otherwise converted into the desired polymer shapes. On the other hand, if the polymerization is carried more nearly to completion by extensive heating, a dark red insoluble solid is formed which precipitates from the solution and can be separated by filtration. Such a polymer can be characterized as being tough, that is, extremely difficult to grind. A typical pulverized sample is completely amorphous by X-ray defraction and has no softening point up to 450° C., the limiting temperature of the apparatus used. Solutions of these polymers in concentrated sulphuric acid, polyphosphoric acid, benzene sulphonic acid, or methane sulphonic acid are intensively red. Aqueous KOH solutions are brown. BBB polymers cyclized by heat appear to be essentially insoluble in dimethylformamide, dimethylacetamide, dimethylsulphoxide, cresol, tetramethylene sulphone, hexamethyl phosphoramide and other common organic solvents. Low viscosity polymers exhibit some tendencies to dissolve in perfluoroacetic acid and formic acid.

PREPARATION OF FIBER

As has been previously described in the art, the polymers of the type just described can be formed into filaments by wet-spinning methods, i.e., extruding a solution of the polymer in an appropriate solvent, such as sulphuric acid, through an opening of predetermined shape into a coagulation bath, e.g., sulphuric acid/water coagulation bath, which results in a filamentary material of the desired cross-section.

Polymer solutions may be prepared, for example, by dissolving sufficient polymer in the solvent to yield a final solution suitable for extrusion which contains about 2% to 15% by weight, preferably about 3% to 10% by weight, of polymer based on the total weight of the solution it is found that the polymer dissolves most readily on warming to a temperature of between about 50° to 70° C. to produce a viscous, deep purple solution. If sulphuric acid is employed, from 85 to 107 equivalent weight percent sulphuric acid, preferably 92 to 102 equivalent weight percent sulphuric acid, is employed as the solvent. The polymeric spinning solution is then extruded into a coagulation bath, i.e., wet spun, to form filaments. These are then washed to remove free acid and dried, and hot drawn and passed through a hot flame or an equivalent high temperature zone in accordance with the present invention.

Hot drawing or some other form of adequate orientation of the polymer molecules in the fiber, film or other article to be improved in accordance with the present invention generally should precede the novel heat treating step, and the degree of orientation obtained should be sufficient to overcome the inherent weakness of this kind of polymer and enable it to resist the mechanical stress to which it is subsequently exposed. Such preliminary orientation and strengthening of the fiber or film is particularly important when the heat treatment is effected in a high speed, dynamic process as described in subsequent parts of this specification. Particularly desirable processes and conditions for hot drawing this kind of fiber or film are illustrated and described in my companion application Ser. No. 681,137, filed concurrently herewith, the disclosure of which is incorporated herein in toto by reference.

As suggested above, a suitable heat treating zone may be established simply by combustion of a liquid or gaseous hydrocarbon in an oxygen-containing gas, e.g., by combustion of propane in air. However, in commercial practice other types of heat treating zones, e.g., an externally heated muffle furnace maintained at the desired temperature, may be preferred. A muffle furnace containing an inert atmosphere such as argon may be particularly preferred for effecting the desired kind of heat treatment with a minimum of deleterious side effects.

As has been described in copending application Ser. No. 657,868, filed jointly by the present applicant and Arnold J. Rosenthal, while filaments of satisfactory properties can be made from BBB type polymers under a variety of spinning conditions, filaments possessing superior properties which make them particularly suitable for use in the present invention can be obtained by maintaining the coagulation bath within certain parameters. For instance, when spinning a BBB polymer solution having an inherent viscosity between about 1.0 and 4.0, preferably between 2 and 3, and using an aqueous sulphuric acid coagulation bath, it is desirable to maintain such a bath at a temperature between about 45° and 80° C., preferably between about 55° and 70° C., and to maintain the sulphuric acid concentration in the bath between about 50% and 80% by weight, optimally between 70% and 75%. When operating within these parameters, a precursor (as-spun) fiber is obtained which is suitable for producing after-drawn fibers of superior tensile properties and strength retention at the extreme elevated temperatures for which the present invention is intended.

After such wet spinning, the resulting precursor (as-spun) fibers are washed thoroughly in order to remove excess acid and to minimize contamination. Then, they are dried pior to being drawn in order to improve their physical characteristics, e.g., tenacity, elongation, thermal resistance, etc. After drawing of the spun filaments is desirably performed at temperatures between about 500° and 700° C. at a draw ratio of from about 1.1:1 to about 3:1. BBB fibers drawn in this manner have strength in excess of 3 grams per denier and thermal resistance at temperatures as high as 700° or 800° C.

To illustrate the practice of the present invention more concretely, a typical embodiment thereof will next be described with reference to the attached drawing. It should be understood that while the following description is made in connection with the treatment of a fiber, the invention can be similarly applied to film by making only minor and obvious modifiactions in the equipment used.

Referring to the attached drawing, afterdrawn BBB polymer fiber 1 is unwound at a rate between about 20 and 100 m./min., at about 30 m./min., from a perforated feed bobbin 2 by means of a conventional Alsimag guide, passed through a hot air (muffle) furnace 4 at between about 500° and 700° C., e.g. 600° C., the length of the furnace and the rate of fiber travel being coordinated such that the fiber has a residence time of between about 0.1 and 2 seconds at the desired preheated temperature. From the furnace the fiber is then immediately passed through an ultra-high temperature zone maintained at a temperature between about 750° and 1500° C., preferably between about 1000° and 1300° C., e.g., through a propane flame of appropriate width having a temperature of about 1200° C. The residence time of the fiber in such a flame is desirably maintained at not more than 0.03 second to minimize fiber dissipation, preferably at between about 0.005 and 0.02 second. The optimum residence time of course depends somewhat on the fiber diameter, the specific polymer from which it was made, as well as the specific temperature and other characteristics of the high temperature zone and is best determined empirically by a few preliminary runs.

By proper treatment in this manner, the high temperature stability of the fiber can be increased by 10% or more, comparing the high temperature tenacity of the fiber treated in accordance with this invention with the high temperature tenacity of the same fiber after the customary hot drawing but before treatment in accordance with the present invention, the tenacities being determined at a test temperature of 600° C. on fiber samples preconditioned at this temperature for 1 minute. After passage through the high temperature zone such as propane flame 5 the fiber is then guided with the aid of another guide 6 onto a draw bobbin 7 at a rate which preferably is substantially the same as the rate of the fiber on the feed bobbin, that is at a draw ratio of between about 1:1 and 1.5:1, preferably not greater than 1.2:1.

The invention will now be further described in terms of some specific, illustrative examples. Absent other indications, it should be understood that all quantities and proportions of materials are expressed on a weight basis throughout this entire specification.

EXAMPLE 1

In this example an afterdrawn BBB fiber was preheated in a hot air furnace at an intermediate temperature and then passed immediately through a propane flame at about 1200° C. This fiber was composed of BBB polymer, i.e., the reaction product of 1,4,5,8-naphthalene tetracarboxylic acid and 3,3'-diaminobenzidine made in an otherwise known manner as described earlier herein. The polymer had an inherent viscosity of 3.2 dl./g. in 97% $H_2SO_4$. The fiber was made from this polymer by dissolving it in 4% concentration in 97% sulphuric acid and extruding this solution from a bomb under pressure of 70 p.s.i. nitrogen through a 5-fil, 100-micron spinneret into an aqueous sulphuric acid coagulation bath. The dope or spinning solution had a viscosity of 4000 poises at 30° C. Coagulation bath was aqueous sulphuric acid containing 68% $H_2SO_4$. It was maintained at 60° C. and had an effective length of 100 cm. The spun fiber was taken up from the bath at a rate of 4.0 m./min.

The resulting spun fiber was washed 30 minutes in 0.1% ammonia solution in deionized water at 50° C., dried in air at about 25° C., and then drawn in a hot-air muffle furnace having an effective length of 15 cm. The furnace was maintained at a temperature of about 600° C. and the fiber was drawn therethrough at a draw ratio of 1.52.

This afterdrawn fiber was then unwound at a rate of 20 m./min. from a perforated bobbin and, by means of a conventional Alsimag guide, passed through a 1./ft., hot-air muffle furnace maintained at 600° C. (effective length, 15 cm.) and from the muffle furnace immediately through the full width of a propane flame which was 1 cm. wide and had a temperature of about 1200° C. The flame treated fiber was then guided onto a bobbin also at 20 m./min., i.e., without any additional draw. Accordingly, the fiber had a residence time of about 0.5 second in the muffle furnace and a residence time of about 0.03 second in the flame. At these conditions, the fiber glowed in and was blackened by the propane flame, but retained its fiber character and did not dissipate.

By contrast when the same fiber was passed from the feed bobbin directly into the propane flame without any preheating at an intermediate temperature, the fiber dissipated in the flame.

The BBB fiber flame treated in accordance with this invention had outstanding high temperature resistance as indicated by the fact that when held in the flame of a propane torch it glowed but retained its fibrous form. By contrast, polybenzimidazole fiber, i.e., fiber made from a polymer such as that described in U.S. Pat. 3,174,947 to Marvel and which heretofore has been considered a particularly good fiber forming polymer for high temperature use, shrivelled and formed a friable bead when held in the propane flame.

When the successful flame treatment described above was repeated under the same conditions as described except that the fiber was passed through the furnace and the flame at lower rates, i.e., at 6 m./min. and 10.5 m./min., the fiber dissipated in each instance in the flame as at these reduced rates the residence time of the fiber in the high temperature flame was excessive.

The drawn and flamed fiber was insoluble in sulfuric acid. The drawn and flamed fiber retained at least 60% of its strength at 600° C. and is not destroyed at temperatures up to about 900° C. or higher.

Flame residence times of less than 0.02 second, preferably between 0.05 and 0.015 second are preferred to keep loss in fiber yield low.

EXAMPLE 2

A series of evaluations was made with fibers made from BBB polymers each having a different inherent viscosity or molecular weight. Each of the fibers was treated essentially as described in Example 1, except for the specific treating conditions noted in the footnotes under Table I, which table contains a summary of the significant data. The physical properties of the fibers were determined both on the afterdrawn fibers before flame treatment and on flame treated fibers, i.e., on the fibers treated in accordance with the present invention and the change in properties noted.

The data in Table I show that overall flame treatment is advantageous in enhancing fiber properties and that the degree of enhancement increases with the inherent viscosity of the polymer.

EXAMPLE 3

While Example 2 shows the advantage of the flamed fibers in terms of their performance characteristics at room temperature, the data summarized in Table II show the advantage of the flame treated fibers in terms of their properties at elevated temperatures. As indicated in the table, the fiber in Run No. II–1 was drawn at 600° C. but not further treated whereas the fiber in Run No. II–2.

TABLE I.—FLAME-TREATING OF DRAWN BBB FIBERS

| Polymer I.V., dl./g. | Parameter | Average Drawn Properties [1] | Average After-Flame Properties [2] | Percent Change |
|---|---|---|---|---|
| 1.4 | D.p.f. | 5.5 | 5.0 | −9 |
|  | Ten. (g./d.) | 3.0 | 3.1 | +3 |
|  | Elong. (percent) | 10.0 | 11.0 | +10 |
|  | TE$^{1/2}$ | 9.5 | 10.3 | +9 |
|  | Mi (g./d.) | 93 | 96 | +3 |
| 2.6 | D.p.f. | 5.0 | 4.5 | −10 |
|  | Ten. (g./d.) | 4.3 | 4.6 | +7 |
|  | Elong. (percent) | 6.3 | 7.0 | +11 |
|  | TE$^{1/2}$ | 10.8 | 12.0 | +11 |
|  | Mi (g./d.) | 124 | 143 | +15 |
| 3.2 | D.p.f. | 4.8 | 4.2 | −12 |
|  | Ten. (g./d.) | 3.8 | 4.2 | +10 |
|  | Elong. (percent) | 6.0 | 9.5 | +58 |
|  | TE$^{1/2}$ | 9.3 | 13 | +40 |
|  | Mi (g./d.) | 130 | 151 | +16 |

[1] Drawn at 600° C., 2.0 draw ratio, 4 sec. in furnance.
[2] Drawn as above, then preheated 0.2 sec. in furnance at 600° C. and flamed 0.015 sec. in 1,200° C. flame.

TABLE II. BBB FIBER PROPERTIES AT ELEVATED TEMPERATURES

| | Run Number | | | | | |
|---|---|---|---|---|---|---|
| | II–1 | | | II–2 | | |
| Polymer I.V. | | | | | | |
| Draw ratio | | | | | | |
| Flame treated | 3.2 dl./g. 2.0x at 600°C. No. 4.3 | | | 2.57 dl./g. 2.0x at 600° C. 0.002 sec. at 1,200° C. [3] 4.5 | | |
| D.p.f. | | | | | | |

| Test Temp., ° C. [1] | El., percent | Ten., g./d. | Mi, g./d. | El., percent | Ten., g./d. | Mi, g./d. |
|---|---|---|---|---|---|---|
| 25 | 5 | 4.6 | 174 | 6 | 4.4 | 135 |
| 100 | 4 | 4.1 | 133 | 6 | 4.2 | 146 |
| 200 | 4 | 4.0 | 146 | 4 | 3.7 | 138 |
| 300 | 5 | 3.5 | 137 | 4 | 3.7 | 132 |
| 400 | 5 | 3.2 | 127 | 5 | 3.4 | 129 |
| 500 | | 2.8 | 115 | 5 | 3.4 | 125 |
| 600 [2] | 6 | 2.3 | 106 | 6 | 2.6 | 99 |

[1] Samples conditioned one minute at test temperature.
[2] Limit of testing oven.
[3] After preheating 0.2 sec. at 600° C.

was flame treated in accordance with the present invention after having been hot-drawn. Though the fiber II–1 was made from a polymer having a higher inherent viscosity and had a higher tenacity at room temperature than fiber II–2 it is evident from the data that the flame treated fiber retains its tensile properties at elevated temperatures to a substantially higher degree than the fiber which was only hot-drawn. For instance, while the drawn fiber II–1 had a significantly higher tenacity and initial modulus at room temperature, the two fibers had very nearly the same properties in the temperature range between about 200° and 400° C., and at the still higher temperatures the flame treated fiber was markedly superior to the drawn-only fiber not only in terms of percent retention of tenacity and initial modulus but also in terms of absolute tenacity.

In another series of tests a measure of thermal stability was obtained by observing the loss of strength which the fibers undergo after storage at elevated temperature. In this test, samples were suspended in a circulating hot air oven at 360° C. and removed after a specified time for testing. Hot-drawn BBB fiber, hot-drawn and flame treated BBB fiber and PBI (polybenzimidazole) fiber were tested in this manner. The data obtained (not reproduced here) have shown that the two BBB fibers retained about the same percent of their initial strength after 30 hours as the PBI filter after 1 hour. After 2 hours the BBB fibers surpassed PBI in both tenacity and elongation whereas little effect on modulus with time is noted for either fiber. After 18 hours exposure the PBI same disappeared from the oven as a result of either breaking away from its mounting or degrading whereas the BBB fibers still retained a high degree of utility after 30 hours as indicated above. In each instance the flame treated BBB fiber showed a noticeable advantage over the drawn-only BBB fiber.

An additional indication of the high temperature behavior of BBB drawn and flame treated fiber is obtained by determining its temperature/weight retention properties. In such a test samples of the fiber are heated in an oven, in air or nitrogen, and the weight of the fiber samples is determined after they have been heated to specified temperatures. The fibers are heated in the oven at a rate of 15° C./min. The data are summarized in Table III below.

As this table shows the BBB fibers have a temperature/weight retention advantage over a prior art fiber such as Nomex fiber, described in "New Linear Polymers" (Lee, Stoffey and Neville), p. 11, and U.S. Pat. No. 3,414,645 to Morgan, of about 150° C. in air and about 350° C. in nitrogen. Furthermore, particularly in the temperature range above 700° C. there is a significant temperature/weight retention advantage for the BBB fiber which was drawn and flame treated over merely drawn BBB fiber. In air, the flame treated BBB fiber retains a given percentage of its room temperature weight at a temperature about 20° C. higher than the BBB fiber which was merely drawn; and in nitrogen the flame treated BBB fiber retains about the same percentage of its original weight at a temperature which is about 40° to 100° C. higher than the merely drawn BBB fiber and the advantage in favor of the flame treated fiber appears to increase with temperature.

TABLE III. WEIGHT RETENTION (PERCENT OF ROOM TEMPERATURE WEIGHT)

| Temp., °C. | NOMEX | | BBB Drawn at 600° C. | | BBB Drawn at 600° C. and Flamed at 1,200° C. | |
| --- | --- | --- | --- | --- | --- | --- |
| | In air | In $N_2$ | In Air | In $N_2$ | In Air | In $N_2$ |
| 25 | 100 | 100 | 100 | 100 | 100 | 100 |
| 200 | 98 | 95 | 99 | | | |
| 400 | 95 | 90 | 98 | | 98 | 98 |
| 500 | 74 | 75 | 97 | | | |
| 600 | 10 | 65 | 97 | 98 | 96 | 97 |
| 700 | 2 | 55 | 40 | 93 | 50 | 95 |
| 800 | | 45 | 15 | 78 | 30 | 85 |
| 900 | | 33 | | 70 | 28 | 73 |
| 1,000 | | 30 | | 60 | | 65 |
| 1,100 | | | | 50 | | 60 |

Having described the invention, it is particularly pointed out in the appended claims.

1. A process for improving the thermal stability of oriented bisbenzimidazobenzophenanthroline polymer fiber which comprises passing said fiber through a preheating zone maintained at a preheat temperature between about 500° and 700° C. at a rate such that the fiber has a residence time of between about 0.05 and about 0.5 second at said preheat temperature, and then immediately passing said fiber from said preheating zone to and through a flame treating zone maintained at a temperature between about 1000° and 1300° C., said fiber being passed through the said flame treating zone at a rate such that the fiber residence time therein is less than 0.03 second but sufficient to improve the thermal stability of the fiber.

2. A process according to claim 1 wherein the fiber being fed to the process is a wet spun and after-drawn fiber.

3. A process wherein poly(bisbenzimidazobenzophenanthroline) having an inherent viscosity of between about 0.5 and 5.0 in 97% sulphuric acid is formed into fiber by extruding thin streams of a solution of said polymer in concentrated sulphuric acid into a coagulation bath, the resulting fiber is washed and dried and then drawn at a draw ratio of between about 1.1:1 and 3:1 and at a draw temperature between about 500° and 700° C. to increase its tenacity to at least 3 grams per denier and the drawn fiber is recovered for further use, the improvement which comprises continuously preheating said drawn fiber to a temperature between about 500° and 700° C. and continuously passing said preheated fiber immediately through a high temperature zone maintained at between about 1000° and 1500° C. at a rate such that the residence time of the preheated fiber in said high temperature zone is not more than about 30 milliseconds but sufficient to increase its temperature tenacity by at least 10% as compared with its high temperature tenacity prior to the aforesaid preheating and high temperature heating steps, said tenacity being measured at a test temperature of 600° C. on fiber samples preconditioned at said test temperature for 1 minute.

4. A process according to claim 3 wherein said high temperature zone is formed by the combustion of a hydrocarbon gas.

5. A process according to claim 3 wherein said high temperature zone comprises a propane flame.

6. A process according to claim 3 wherein said high temperature zone is an externally heated zone containing an inert gaseous atmosphere.

7. A process according to claim 3 wherein said high temperature zone is an externally heated zone containing an argon atmosphere.

References Cited
UNITED STATES PATENTS 3,414,543 12/1968 Paufler.
3,414,645 12/1968 Morgan.
3,415,782 12/1968 Irwin et al.
3,441,640 4/1969 Santangelo _____ 264—203

OTHER REFERENCES

Lee, Stoffey and Neville: "New Linear Polymers," 1967, McGraw Hill, N.Y., p. 11.

DONALD, J. ARNOLD, Primary Examiner

H. MINTZ, Assistant Examiner

U.S. Cl. X.R.

260—47, 78, 78.4; 264—290, 345, 334, 80

PO-1050
(5/69)

UNITED STATES PATENT OFFICE
CERTIFICATE OF CORRECTION

Patent No. 3,523,151     Dated August 4, 1970

Inventor(s) Jay M. Steinberg

It is certified that error appears in the above-identified patent and that said Letters Patent are hereby corrected as shown below:

In column 3, line 31, "25" should read -- 25° --.

In column 5, line 16, "it" should read --.It--.

In column 6, line 21, after the first "min.," there should be inserted --e.g.,--.

Signed and sealed this 18th day of April 1972.

(SEAL)
Attest:

EDWARD M.FLETCHER,JR.
Attesting Officer

ROBERT GOTTSCHALK
Commissioner of Patents